United States Patent
Kolar et al.

(10) Patent No.: US 11,451,132 B2
(45) Date of Patent: Sep. 20, 2022

(54) MULTI-PHASE CONVERTER TOPOLOGY FOR MULTI-PHASE AND SINGLE-PHASE OPERATION

(71) Applicant: Prodrive Technologies B.V., Son en Breugel (NL)

(72) Inventors: Johann Walter Kolar, Zürich (CH); Panteleimon Papamanolis, Zürich (CH); Florian Krismer, Sr., Geroldswil (CH)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 0 days.

(21) Appl. No.: 17/283,910

(22) PCT Filed: Oct. 15, 2019

(86) PCT No.: PCT/EP2019/078002
§ 371 (c)(1),
(2) Date: Apr. 8, 2021

(87) PCT Pub. No.: WO2020/079019
PCT Pub. Date: Apr. 23, 2020

(65) Prior Publication Data
US 2021/0384815 A1   Dec. 9, 2021

(30) Foreign Application Priority Data
Oct. 15, 2018   (CH) .................................... 01255/18

(51) Int. Cl.
*H02M 1/10* (2006.01)
*H02M 7/219* (2006.01)
(Continued)

(52) U.S. Cl.
CPC ............. *H02M 1/10* (2013.01); *H02M 7/219* (2013.01); *H02M 7/757* (2013.01); *H02M 1/0074* (2021.05); *H02M 1/0077* (2021.05)

(58) Field of Classification Search
CPC .... H02M 1/10; H02M 1/0074; H02M 1/0077; H02M 7/219; H02M 7/757
See application file for complete search history.

(56) References Cited

U.S. PATENT DOCUMENTS

| 5,969,583 A | * | 10/1999 | Hutchison | .............. | H03H 7/427 333/185 |
| 2014/0035492 A1 | | 2/2014 | Ahmed | | |

(Continued)

FOREIGN PATENT DOCUMENTS

| CN | 107947309 A | 4/2018 |
| EP | 2892136 A1 | 8/2015 |

(Continued)

OTHER PUBLICATIONS

International Search Report and Written Opinion of the International Searching Authority from the European Patent Office, in PCT/EP2019/078002 dated Jan. 10, 2020, which is an international application corresponding to this U.S. application.
Boillat, David Olivier, et al.; "EMI Filter Volume Minimization of a Three-Phase, Three-Level T-Type PWM Concerter System"; IEEE Transactions on Power Electronics, vol. 32, No. 4, Apr. 2017.
(Continued)

*Primary Examiner* — Jue Zhang
(74) *Attorney, Agent, or Firm* — Kolitch Romano LLP

(57) ABSTRACT

A multiphase converter topology is used for the transmission of electrical energy from an AC voltage input with m grid phase connections to a DC voltage output or vice versa. It has a power part with half-bridges for switching currents, an AC voltage filter between the power part and the AC voltage input, and DC voltage block(s) connected between the
(Continued)

power part and the DC output. The AC voltage filter has alternating voltage filter stage(s) with m+1 input connections, m+1 output connections and a ground connection. The m grid phase connections are thereby connected in parallel to one another and form a first phase connection for the connection of a single-phase AC voltage. A neutral conductor connection of the AC voltage filter forms a neutral conductor connection of the AC voltage input and a second phase connection for the connection of the single-phase AC voltage.

18 Claims, 9 Drawing Sheets

(51) Int. Cl.
*H02M 7/757* (2006.01)
*H02M 1/00* (2006.01)

(56) References Cited

U.S. PATENT DOCUMENTS

| | | | |
|---|---|---|---|
| 2015/0194905 A1* | 7/2015 | White | H02M 7/06 363/126 |
| 2016/0072397 A1* | 3/2016 | Deboy | H02M 3/33592 363/21.1 |
| 2019/0074775 A1* | 3/2019 | Chimento | H02J 7/02 |
| 2021/0347271 A1 | 11/2021 | Pfeilschifter et al. | |

FOREIGN PATENT DOCUMENTS

| | | |
|---|---|---|
| EP | 3242382 A1 | 8/2017 |
| GB | 2541705 A | 1/2017 |

OTHER PUBLICATIONS

Hartmann, Michael; "Ultra-Compact and Ultra-Efficient Three-Phase PWM Rectifier systems for More Electric Aircraft", PhD dissertation ETH No. 19755, ETH Zurich, 2011.

* cited by examiner

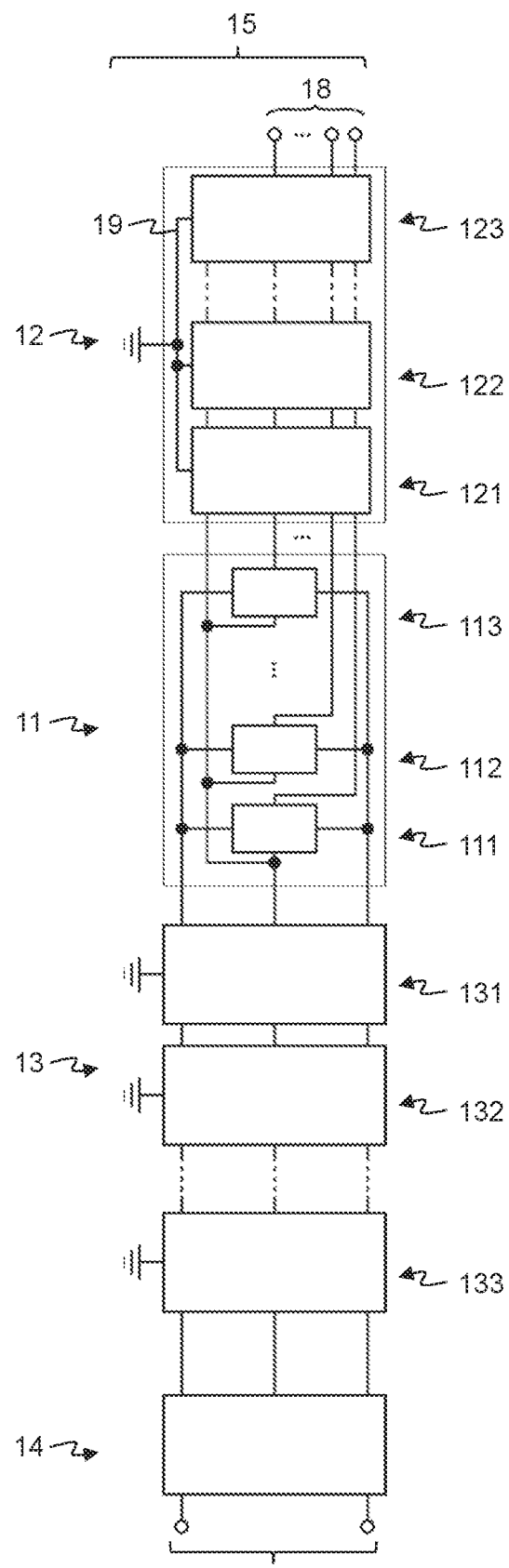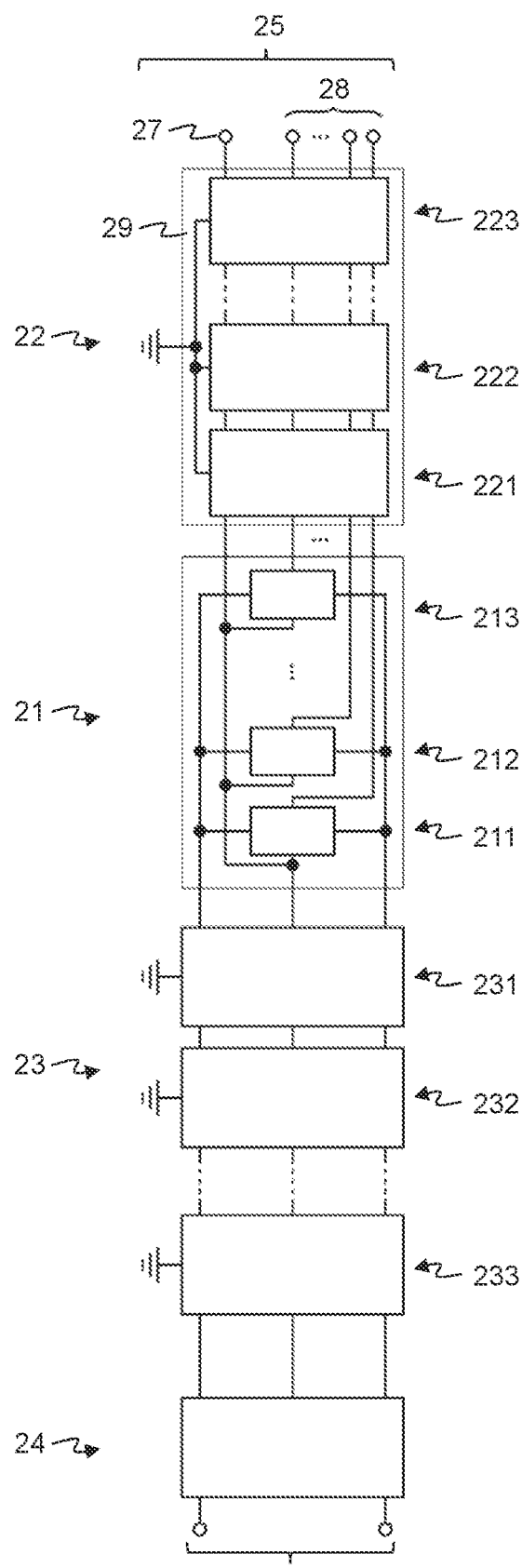
Fig. 1
Fig. 2

MULTI-PHASE CONVERTER TOPOLOGY FOR MULTI-PHASE AND SINGLE-PHASE OPERATION

INTRODUCTION

For the single-phase operation of a conventional multi-phase converter topology, two basic operating modes are known:

1. A first phase of the conventional multi-phase converter topology is used as a forward conductor, a second phase of the conventional multi-phase converter topology is used as a return conductor and the remaining phases of the conventional multi-phase converter topology are not used. This operating mode is described for m=3 and for operation with a chained grid voltage, as it exists, for example, in the three-phase grid during a phase failure, in M. Hartmann, "Ultra-Compact and Ultra-Efficient Three-Phase PWM Rectifier systems for More Electric Aircraft", PhD dissertation ETH No. 19755, ETH Zurich, 2011, and leads, subject to the condition that the maximum permissible current effective value per phase in the three-phase and single-phase operation is the same, to a reduction of the nominal power of the conventional multi-phase converter topology in single-phase operation to approx. 58% of the nominal power in three-phase operation. If this operating mode for m=3 only occurs with the phase voltage (approx. 58% of the chained grid voltage) then, a reduction in the nominal power of the conventional multi-phase converter topology to approx. 33% of the nominal power in three-phase operation is to be expected.
2. One or more phases of the conventional multi-phase converter topology are used as forward conductors, one or more phases of the conventional multi-phase converter topology are used as return conductors and the remaining phases of the conventional multi-phase converter topology are not used. This operating mode makes possible, if necessary, an increase in the nominal power, but is of secondary importance especially in the practically important case m=3, since a saturation of the common-mode filter choke in the alternating voltage filter can occur.

SUMMARY

A problem addressed by the present disclosure is to realize a circuit, which can be operated on the multi-phase grid and on the single-phase grid and, in comparison to known multi-phase topologies, permits an improved singe-phase operation. A further possible problem is to realize at least approximately the same nominal power for single-phase and multi-phase operation.

Accordingly, a multi-phase converter topology of the present disclosure for transmitting electrical energy from an alternating voltage input with m grid phase connections to a DC voltage output or vice versa, has:
 a power part with half-bridges for switching currents,
 an alternating voltage filter connected between the power part and the alternating voltage input, having at least one alternating voltage filter stage with m+1 input connections, m+1 output connections and a ground connection;
 one or more DC voltage blocks connected between the power part and the DC voltage output for filtering DC voltages;

wherein:
 the m grid phase connections are connected to one another in parallel and form a first phase connection for the connection of a single-phase alternating voltage, and a neutral conductor connection of the alternating voltage filter forms a neutral conductor connection of the alternating voltage input and a second phase connection for the connection of the single-phase alternating voltage.

Thus, it is possible to connect all phase connections in parallel in single-phase operation, wherein the phase currents of the m single phases flow through the first m windings, and a return current—corresponding to the sum of the phase currents—flows through the (m+1)-th winding. Thus, in single-phase operation the same nominal power can be transmitted as in multi-phase operation.

In embodiments, the alternating voltage filter has at least one (m+1)-phase common-mode filter choke, which does not saturate in single-phase operation of the universal multi-phase converter.

The common-mode filter choke is therefore dimensioned such that currents, which occur in single-phase operation, lead to magnetic fluxes, which cancel each other out on average over time.

In embodiments, the alternating voltage filter has at least one (m+1)-phase common-mode filter choke, which have the same number of windings and the same sense of winding.

In embodiments, wires provided in the first m windings have a same first conductor cross section, and a wire provided in the (m+1)-th winding has a conductor cross section, which is m-times the first conductor cross section.

In embodiments, the multi-phase converter topology has a DC/DC converter block with at least two DC/DC converters, wherein:
 inputs of the DC/DC converters are selectively switchable between a serial and a parallel arrangement; and/or
 outputs of the DC/DC converters are selectively switchable between a series and a parallel arrangement.

In embodiments, the multi-phase converter topology has a DC/DC converter block with two DC/DC converters, the
 inputs of which are selectively switchable between a series and a parallel arrangement, and the
 outputs of which connected in parallel form the DC voltage output, and
 wherein the power part has half-bridges, which form a converter with two voltage levels.

In embodiments, the multi-phase converter topology has a DC/DC converter block with two DC/DC converters, the
 inputs of which are selectively switchable between a series and a parallel arrangement, and the
 outputs of which connected in parallel form the DC voltage output,
 wherein the power part has half-bridges, which form a converter with three voltage levels; and
 a control is configured to operate the converter topology selectively
 in a multi-phase operation with three voltage levels or
 in a single-phase operation with two voltage levels.

In embodiments, the power part has half-bridges for switching three voltage levels, wherein outputs of a DC voltage block form the DC voltage output.

BRIEF DESCRIPTION OF THE DRAWINGS

The subject matter of the present disclosure is explained in detail below by way of preferred embodiments, which are represented in the attached drawings, wherein schematically:

FIG. 1 represents a converter topology according to the prior art;

FIG. 2 represents a converter topology according to the present disclosure;

DETAILED DESCRIPTION

Figure 3:
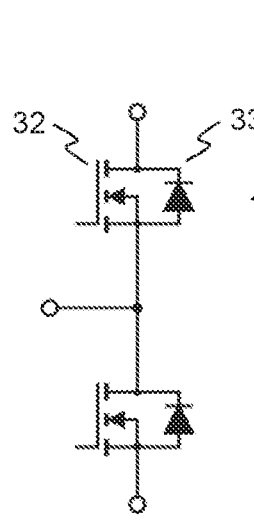
FIG. 3 represents a first embodiment of a half-bridge.

A multi-phase converter topology is used to convert alternating voltages provided by a supply grid at an alternating voltage input into a DC voltage present at a DC voltage output. The operation of the multi-phase converter topology should be possible both from a multi-phase as well as from a single-phase supply grid. The number of the available grid phases of the supply grid is denoted by m, m>1 (as a rule m=3).

In principle, the multi-phase and the single-phase operation, i.e., an operation in connection with a multi-phase or single-phase supply grid at the alternating voltage side, can already be realized with a conventional multi-phase converter topology. A conventional multi-phase converter topology is depicted schematically in FIG. 1 and has a grid voltage input 15 (having m grid phase connections 18 and a ground connection 19), a DC voltage output 16 (having a plus- and a minus connection) and the following basic components:

A grid filter 12 having m grid phase connections, a ground connection, m switching voltage connections and a midpoint voltage connection. The grid filter has w grid filter stages 121, 122, 123, wherein the variable 'w' can assume integer values greater than or equal to one. Each grid filter stage has m+1 input connections, m+1 output connections and a ground connection. The following applies for $1 \le k \le m$:

The k-th output connection of the first grid filter stage 121 forms the k-th switching voltage connection of the grid filter 12.

The k-th input connection of the w-th grid filter stage forms the k-th grid phase connection of the grid filter 12 and thus the k-th grid phase connection of the grid voltage input 14 of the multi-phase converter topology.

The (m+1)-th output connection of the first grid filter stage 121 forms the midpoint voltage connection of the grid filter. When w>1, the following applies for $1 \le k \le m+1$ and $1 \le u \le w$: the k-th input connection of the u-th grid filter stage is connected to the k-th output connection of the (u+1)-th grid filter stage. The ground connections of all grid filter stages are connected with one another and form the ground connection of the grid filter, which is connected to the ground connection of the grid voltage input of the multi-phase converter topology.

A power part 11 having a plus connection, a minus connection, a midpoint voltage connection, m switching voltage connections and m half-bridges 111, 112, 113 each having a plus connection, a minus connection, a midpoint voltage connection and a switching voltage connection. The plus connections of all m half-bridges are connected to each other and form the plus connection of the power part. The midpoint voltage connections of all m half-bridges are connected to each other and form the midpoint voltage connection of the power part. The minus connections of all m half-bridges are connected to each other and form the minus connection of the power part. The following applies for $1 \le k \le m$: the switching voltage connection of the k-th half-bridge forms the k-th switching voltage connection of the power part.

One or more DC voltage blocks 13; 131, 132, 133 each having a ground connection, an input terminal block, having a plus connection, a midpoint voltage connection and a minus connection, and an output terminal block, having a plus connection, a midpoint voltage connection and a minus connection. The number of DC voltage blocks is denoted by g and g can assume integer values greater than or equal to one. Depending on the embodiment of the DC voltage block, the midpoint voltage connection of the input terminal block of the DC voltage block, the midpoint voltage connection of the output terminal block or the midpoint voltage connections of the input and output terminal blocks can be omitted. The ground connections of all DC voltage blocks are connected to the ground connection of the grid voltage input of the multi-phase converter topology. If g>1 applies, then the DC voltage blocks are connected with each other as follows, wherein $1 \le f < g$:

The plus connection of the output terminal block of the f-th DC voltage block is connected to the plus connection of the input terminal block of the (f+1)-th DC voltage block.

The midpoint voltage connection of the output terminal block of the f-th DC voltage block is connected to the midpoint voltage connection of the input terminal block of the (f+1)-th DC voltage block.

The minus connection of the output terminal block of the f-th DC voltage block is connected to the minus connection of the input terminal block of the (f+1)-th DC voltage block.

A DC/DC converter block 14 having an input terminal block, having a plus connection, a midpoint voltage connection and a minus connection, and an output terminal block, having a plus connection and a minus connection.

For 1≤k≤m the following applies: the k-th switching voltage connection of the power part is connected to the k-th switching voltage connection of the grid filter. The plus connection of the power part is connected to the plus connection of the input terminal block of the first DC voltage block. The minus connection of the power part is connected to the minus connection of the input terminal block of the first DC voltage block. The midpoint voltage connection of the power part is connected to the midpoint voltage connection of the grid filter and the midpoint voltage connection of the input terminal block of the first DC voltage block.

The plus connection of the output terminal block of the g-th DC voltage block is connected to the plus connection of the input terminal block of the DC/DC converter block 14. The midpoint voltage connection of the output terminal block of the g-th DC voltage block is connected to the midpoint voltage connection of the input terminal block of the DC/DC converter block. The minus connection of the output terminal block of the g-th DC voltage block is connected to the minus connection of the input terminal block of the DC/DC converter block. The plus connection of the output terminal block of the DC/DC converter block forms the plus connection of the DC voltage output of the conventional multi-phase converter topology. The minus connection of the output terminal block of the DC/DC converter block forms the minus connection of the DC voltage output 16 of the conventional multi-phase converter topology.

FIG. 2 schematically represents a universal multi-phase converter topology, having an alternating voltage input 25 (having m grid phase connections 28, a neutral conductor connection 27 and a ground connection 29), a DC voltage output 26 (having a plus- and a minus connection) and the following basic components:

an alternating voltage filter 22 having m grid phase connections, a neutral conductor connection, a ground connection, m switching voltage connections and a midpoint voltage connection. The alternating voltage filter 22 has w alternating voltage filter stages 221, 222, 223, wherein the variable 'w' can assume integer values greater than or equal to one. Each alternating voltage filter stage 221, 222, 223 has m+1 input connections, m+1 output connections and a ground connection. For 1≤k≤m the following applies.

The k-th output connection of the first alternating voltage filter stage 221 forms the k-th switching voltage connection of the alternating voltage filter.

The k-th input connection of the w-th alternating voltage filter stage forms the k-th grid phase connection of the alternating voltage filter and thus the k-th grid phase connection of the grid voltage input of the multi-phase converter topology.

The (m+1)-th output connection of the first alternating voltage filter stage 221 forms the midpoint voltage connection of the alternating voltage filter. The (m+1)-th input connection of the w-th alternating voltage filter stage forms the neutral conductor connection of the alternating voltage filter and thus the neutral conductor connection of the grid voltage input of the multi-phase converter topology. At w>1, for 1≤k≤m+1 and 1≤u<w, it applies that the k-th input connection of the u-th alternating voltage filter stage is connected to the k-th output connection of the (u+1)-th alternating voltage filter stage. The ground connections of all alternating voltage filter stages are connected to one another and form the ground connection of the alternating voltage filter, which is connected to the ground connection of the grid voltage input of the multi-phase converter topology.

A power part 21.

One or more DC voltage blocks 23.

depending on the embodiment of the universal multi-phase converter, a DC/DC converter block 24.

The structure of the connections between the blocks can be the same as in FIG. 1, unless there is provided a different embodiment as described below.

For 1≤k≤m the following applies: the k-th switching voltage connection of the power part 21 is connected to the k-th switching voltage connection of the alternating voltage filter 22. The plus connection of the power part 21 is connected to the plus connection of the input terminal block of the first DC voltage block 231. The minus connection of the power part 21 is connected to the minus connection of the input terminal block of the first DC voltage block 231. The midpoint voltage connection of the power part 21 is connected to the midpoint voltage connection of the alternating voltage filter and the midpoint voltage connection of the input terminal block of the first DC voltage block 231.

Embodiment of the universal multi-phase converter topology without DC/DC converter block: the plus connection of the output terminal block of the g-th DC voltage block 233 forms the plus connection of the DC voltage output 26 of the universal multi-phase converter topology and the minus connection of the output terminal block of the g-th DC voltage block 233 forms the minus connection of the DC voltage output 26 of the universal multi-phase converter topology.

Embodiment of the universal multi-phase converter topology with DC/DC converter block: here the following connections apply:

plus connection of the output terminal block of the g-th DC voltage block 233 to the plus connection of the input terminal block of the DC/DC converter block 24, midpoint voltage connection of the output terminal block of the g-th DC voltage block 233 to the midpoint voltage connection of the input terminal block of the DC/DC converter block 24, minus connection of the output terminal block of the g-th DC voltage block 233 to the minus connection of the input terminal block of the DC/DC converter block 24.

The plus connection of the output terminal block of the DC/DC converter block 24 forms the plus connection of the DC voltage output 26 of the universal multi-phase converter topology. The minus connection of the output terminal block of the DC/DC converter block 24 forms the minus connection of the DC voltage output 26 of the universal multi-phase converter topology.

Examples of Embodiments of the Half-Bridge:

An embodiment of the half-bridge with two voltage levels (FIG. 3) has two power switches 31, in turn having a parallel connection of an actual switching element 32 and an anti-parallel diode 33 (if, for example, a MOSFET is used as a power switch, the anti-parallel diode is already present due to the internal semi-conductor structure of the MOSFET). The two power switches of the half-bridge with two voltage levels are connected in series so that the anode of the anti-parallel diode of the first power switch of the half-bridge with two voltage levels is connected to the cathode of the anti-parallel diode of the second power switch of the half-bridge with two voltage levels. The half-bridge with two voltage levels has three connections: a switching voltage connection of the half-bridge with two voltage levels, a plus connection of the half-bridge with two voltage levels and a minus connection of the half-bridge with two voltage levels. The switching voltage connection of the half-bridge with two voltage levels is connected to the anode of the anti-parallel diode of the first power switch of the half-bridge with two voltage levels, the plus connection of the half-bridge with two voltage levels is connected to the cathode of the anti-parallel diode of the first power switch of the half-bridge with two voltage levels and the minus connection of the half-bridge with two voltage levels to the anode of the anti-parallel diode of the second power switch of the half-bridge with two voltage levels. The midpoint voltage connection is not used in the embodiment of the half-bridge with two voltage levels.

Figure 4:
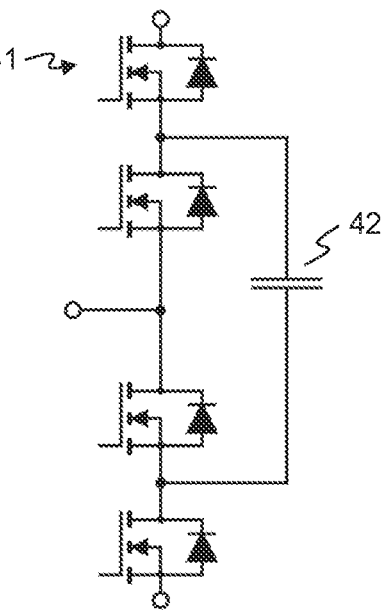
FIG. 4 represents a second embodiment of a half-bridge.

An embodiment of a FCM (Flying Capacitor Multilevel) half-bridge (FIG. 4) has four power switches 41 and a capacitor 42. The four power switches of each FCM half-bridge are interconnected as follows:

the anode of the anti-parallel diode of the first power switch of the FCM half-bridge is connected to the cathode of the anti-parallel diode of the second power switch of the FCM half-bridge, the anode of the anti-parallel diode of the second power switch of the FCM half-bridge is connected to the cathode of the anti-parallel diode of the third power switch of the FCM half-bridge, the anode of the anti-parallel diode of the third power switch of the FCM half-bridge is connected to the cathode of the anti-parallel diode of the fourth power switch of the FCM half-bridge.

The capacitor of the FCM half-bridge has two connections. The first connection of the capacitor of the FCM half-bridge is connected to the anode of the first power switch of the FCM half-bridge. The second connection of the capacitor of the FCM half-bridge is connected to the cathode of the fourth power switch of the FCM half-bridge. The FCM half-bridge has three connections: a switching voltage connection of the FCM half-bridge, a plus connection of the FCM half-bridge and a minus connection of the FCM half-bridge. The switching voltage connection of the FCM half-bridge is connected to the anode of the anti-parallel diode of the second power switch of the FCM half-bridge. The plus connection of the FCM half-bridge is connected to the cathode of the anti-parallel diode of the first power switch of the FCM half-bridge. The minus connection of the FCM half-bridge is connected to the anode of the anti-parallel diode of the fourth power switch of the FCM half-bridge. The midpoint voltage connection is not used in the embodiment of the FCM half-bridge.

An embodiment of an active T-type half-bridge (FIG. 5) has four power switches 51, which are interconnected as follows:

the anode of the anti-parallel diode of the first power switch of the active T-type half-bridge is connected to the cathode of the anti-parallel diode of the second power switch of the active T-type half-bridge, the anode of the anti-parallel diode of the second power switch of the active T-type half-bridge is connected to the anode of the anti-parallel diode of the third power switch of the active T-type half-bridge, the anode of the anti-parallel diode of the first power switch of the active T-type half-bridge is connected to the cathode of the anti-parallel diode of the fourth power switch of the active T-type half-bridge.

The active T-type half-bridge has four connections:
a switching voltage connection of the T-type half-bridge,
a plus connection of the active T-type half-bridge,
a midpoint voltage connection of the active T-type half-bridge and
a minus connection of the active T-type half-bridge.

The switching voltage connection of the active T-type half-bride is connected to the anode of the anti-parallel diode of the first power switch of the active T-type half-bridge. The plus connection of the active T-type half-bridge is connected to the cathode of the anti-parallel diode of the first power switch of the active T-type half-bridge. The midpoint voltage connection of the active T-type half-bridge is connected to the cathode of the anti-parallel diode of the third power switch of the active T-type half-bridge. The minus connection of the active T-type half-bridge is connected to the anode of the anti-parallel diode of the fourth power switch of the active T-type half-bridge.

Figure 6A:
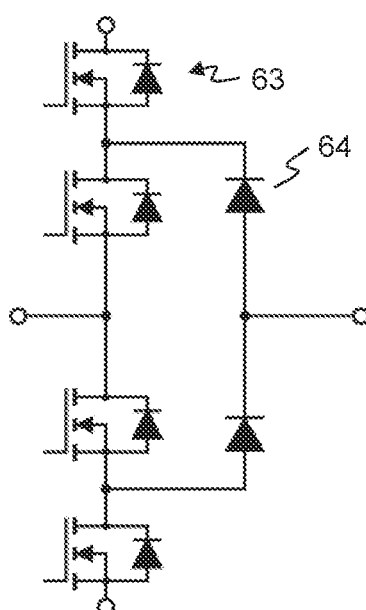
FIG. 6 represents a fourth embodiment of a half-bridge.
Figure 6:
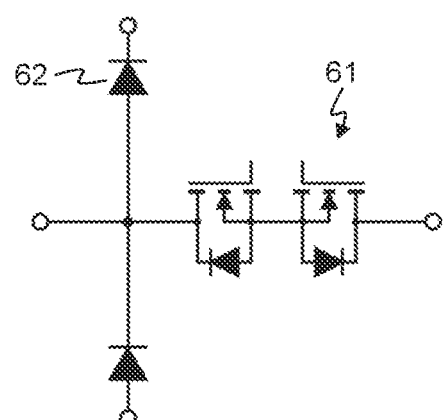

An embodiment of a passive T-type half-bridge (FIG. 6) has two diodes 62 and two power switches 61, which are interconnected as follows:

the anode of the first diode of the passive T-type half-bridge is connected to the cathode of the anti-parallel diode of the first power switch of the passive T-type half-bridge, the anode of the anti-parallel diode of the first power switch of the passive T-type half-bridge is connected to the anode of the anti-parallel diode of the second power switch of the passive T-type half-bridge, the anode of the first diode of the passive T-type half-bridge is connected to the cathode of the second diode of the passive T-type half-bridge.

The passive T-type half-bridge has four connections:
a switching voltage connection of the passive T-type half-bridge,
a plus connection of the passive T-type half-bridge,
a midpoint voltage connection of the passive T-type half-bridge and
a minus connection of the passive T-type half-bridge.

The switching voltage connection of the passive T-type half-bridge is connected to the anode of the first diode of the passive T-type half-bridge. The plus connection of the passive T-type half-bridge is connected to the cathode of the first diode of the passive T-type half-bridge. The midpoint voltage connection of the passive T-type half-bridge is connected to the cathode of the anti-parallel diode of the second power switch of the passive T-type half-bridge. The minus connection of the passive T-type half-bridge is connected to the anode of the second diode of the passive T-type half-bridge.

An embodiment of an NPC (Neutral-Point Clamped) half-bridge (FIG. 6a) has four power switches 63 and two diodes 64, which are interconnected as follows:

the anode of the anti-parallel diode of the first power switch of the NPC half-bridge is connected to the cathode of the anti-parallel diode of the second power switch of the NPC half-bridge and the cathode of the first diode, the anode of the anti-parallel diode of the second power switch of the NPC half-bridge is connected to the cathode of the anti-parallel diode of the third power switch of the NPC half-bridge, the anode of the anti-parallel diode of the third power switch of the NPC half-bridge is connected to the anode of the second diode and the cathode of the anti-parallel diode of the fourth power switch of the NPC half-bridge, the anode of the first diode of the NPC half-bridge is connected to the cathode of the second diode of the NPC half-bridge.

The NPC half-bridge has four connections:
a switching voltage connection of the NPC half-bridge,
a plus connection of the NPC half-bridge,
a midpoint voltage connection of the NPC half-bridge and
a minus connection of the NPC half-bridge.

The switching voltage connection of the NPC half-bridge is connected to the anode of the anti-parallel diode of the second power switch of the NPC half-bridge. The plus connection of the NPC half-bridge is connected to the cathode of the anti-parallel diode of the first power switch of the NPC half-bridge. The midpoint voltage connection of the NPC half-bridge is connected to the anode of the first diode of the NPC half-bridge. The minus connection of the NPC half-bridge is connected to the anode of the anti-parallel diode of the fourth power switch of the NPC half-bridge.

Examples of Embodiments of the Alternating Voltage Filter Stages:

A first embodiment of the alternating voltage filter stage (FIG. 7) has the following components:
an (m+1)-phase common-mode filter choke 71, having m+1 windings, each having two connections,
m+1 filter coils 73, each having two connections,
two common-mode filter capacitors 74, each having two connections, and
m+1 filter capacitors 75, each having two connections.

For 1≤k≤m the following connections apply:
the k-th input connection of the first embodiment of the alternating voltage filter stage to the first connection of the k-th filter capacitor,
the first connection of the k-th filter capacitor to the first connection of the k-th winding of the (m+1)-phase common-mode filter choke,
the second connection of the k-th winding of the (m+1)-phase common-mode filter choke to the first connection of the k-th filter coil,
the second connection of the k-th filter coil to the k-th output connection of the first embodiment of the alternating voltage filter stage.

The (m+1)-th input connection of the first embodiment of the alternating voltage filter stage is connected to the first connection of the (m+1)-th winding of the (m+1)-phase common-mode filter choke, the first connection of the (m+1)-th filter capacitor and the first connection of the second common-mode filter capacitor. The second connections of all m+1 filter capacitors are connected to the first connection of the first common-mode filter capacitor. The second connection of the (m+1)-th winding of the (m+1)-phase common-mode filter choke is connected to the first connection of the (m+1)-th filter coil. The second connection of the (m+1)-th filter coil is connected to the (m+1)-th output connection of the first embodiment of the alternating voltage filter stage. The second connections of the two common-mode filter capacitors are connected to the ground connection of the first embodiment of the alternating voltage filter stage.

For practical reasons it can be useful to swap the order of the (m+1)-phase common-mode filter choke and the m+1 filter coils of the series circuit described. The m+1 filter coils can be magnetically coupled, for example, as a common-mode or push-pull mode choke.

Depending on the realization, one or more components can be omitted:
the (m+1)-phase common-mode filter choke 71 can be omitted, i.e., it applies for 1≤k≤m+1, that the first connection of the k-th winding of the (m+1)-phase common-mode filter choke is connected to the second connection of the k-th winding of the (m+1)-phase common-mode filter choke,
individual or all filter coils 73 can be omitted, i.e., in the case of the respective filter coil or of the respective filter coils, the first connection of the filter coil is connected to the second connection of the filter coil,
individual or all filter capacitors 75 can be removed from the circuit,
one of the m+1 filter capacitors 75 can be replaced by a short circuit,
the first common-mode filter capacitor 74 can either be removed from the circuit or be replaced by a short circuit,
the second common-mode filter capacitor 74 can be removed from the circuit,
combinations thereof, for example, all filter coils can be omitted and the first common-mode filter capacitor can be removed from the circuit.

Figure 8:
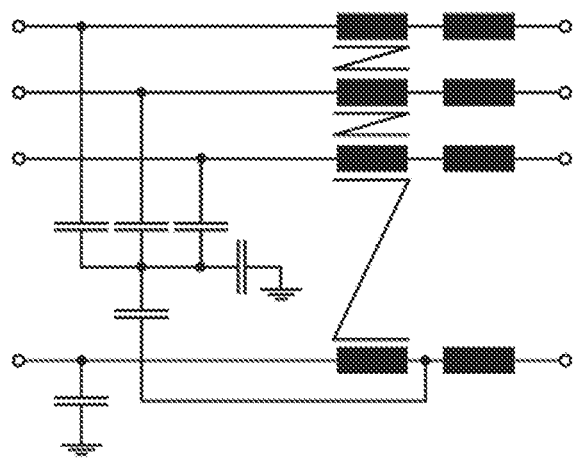
FIG. 8 represents a second embodiment of an alternating voltage filter stage.

A second embodiment of the alternating voltage filter stage (FIG. 8) has the same components as the first embodiment of the alternating voltage filter stage and also the same connections between the components, except for one difference: the first connection of the (m+1)-th filter capacitor of the second embodiment of the alternating voltage filter stage is not connected to the (m+1)-th input connection of the second embodiment of the alternating voltage filter stage, but rather to the second connection of the (m+1)-th winding of the (m+1)-phase common-mode filter choke of the second embodiment of the alternating voltage filter stage.

Figure 9:
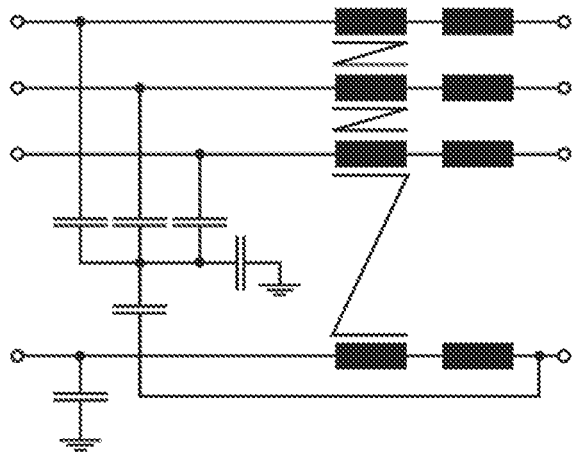
FIG. 9 represents a third embodiment of an alternating voltage filter stage.

A third embodiment of the alternating voltage filter stage (FIG. 9) has the same components as the first embodiment of the alternating voltage filter stage and also the same connections between the components, except for one difference: the first connection of the (m+1)-th filter capacitor of the third embodiment of the alternating voltage filter stage is not connected to the (m+1)-th input connection of the third embodiment of the alternating voltage filter stage, but rather to the (m+1)-th output connection of the third embodiment of the alternating voltage filter stage.

Examples of the Embodiments of the DC Voltage Blocks:

An embodiment of the change-over switching block (FIG. 10) has the following components:
two diodes 101,
a switch 102 (for example, the switch of a conventional relay) having two connections and
a common-mode filter capacitor 103 having two connections.

The switch of the change-over switching block can assume the states 'switched on' or 'switched off'. In the 'switched on' state the switch of the change-over switching block establishes an electrical connection between the two connections of the switch of the change-over switching block. In the 'switched off' state the electrical connection between the two connections of the switch of the change-over switching block is disconnected.

The anode of the first diode of the change-over switching block is connected to the cathode of the second diode of the change-over switching block, the first connection of the switch of the change-over switching block, the first connection of the common-mode filter capacitor of the change-over switching block and the midpoint voltage connection of the input terminal block of the change-over switching block. The cathode of the first diode of the change-over switching block is connected to the plus connection of the input terminal block of the change-over switching block and the plus connection of the output terminal block of the change-over switching block. The anode of the second diode of the change-over switching block is connected to the minus connection of the input terminal block of the change-over switching block and the minus connection of the output terminal block of the change-over switching block. The second connection of the switch of the change-over switching block is connected to the midpoint voltage connection of the output terminal block of the change-over switching block and the second connection of the common-mode filter capacitor is connected to the ground connection of the output terminal block.

In an alternative realization of the change-over switching block there is no common-mode filter capacitor.

A first embodiment of the DC voltage filter block (FIG. 11) has the following components:
- a two-phase common-mode filter choke 115, having two windings, each having two connections,
- two filter coils 116, each having two connections,
- three common-mode filter capacitors 117, each having two connections, and
- two filter capacitors 118, each having two connections.

The first embodiment of the DC voltage filter block realizes the following connections:
- the plus connection of the input terminal of the first embodiment of the DC voltage filter block is connected to the first connection of the first common-mode filter capacitor, the first connection of the first filter capacitor and the first connection of the first winding of the two-phase common-mode filter choke;
- the midpoint voltage connection of the input terminal of the first embodiment of the DC voltage filter block is connected to the first connection of the second common-mode filter capacitor, the second connection of the first filter capacitor and the second connection of the second filter capacitor; the minus connection of the input terminal of the first embodiment of the DC voltage filter block is connected to the first connection of the third common-mode filter capacitor, the first connection of the second filter capacitor and the first connection of the second winding of the two-phase common-mode filter choke;
- the second connection of the first winding of the two-phase common-mode filter choke is connected to the first connection of the first filter coil;
- the second connection of the second winding of the two-phase common-mode filter choke is connected to the first connection of the second filter coil;
- the second connection of the first filter coil is connected to the plus connection of the output terminal of the first embodiment of the DC voltage filter block;
- the second connection of the second filter coil is connected to the minus connection of the output terminal of the first embodiment of the DC voltage filter block;
- the second connections of all common-mode filter capacitors are connected to one another and form the ground connection of the first embodiment of the DC voltage filter block;
- the midpoint voltage connection of the output terminal of the first embodiment of the DC voltage filter block is omitted.

In a further variant of this DC voltage filter block, the described series connections of filter coils and windings of the two-phase common-mode filter choke are swapped.

Depending on the realization, one or more components can be omitted:
- the two-phase common-mode filter choke can be omitted, i.e., it applies for $1 \leq k \leq m+1$, that the first connection of the k-th winding is connected to the second connection of the k-th winding,
- individual or all filter coils can be omitted, i.e., in the respective filter coil or the respective filter coils, the first connection of the filter coil is connected to the second connection of the filter coil,
- individual or all common-mode filter capacitors can be omitted, i.e., the respective common-mode filter capacitor or the respective common-mode filter capacitors are omitted from the circuit,
- combinations thereof, for example, all filter coils and all common-mode filter capacitors can be omitted.

Figure 12:
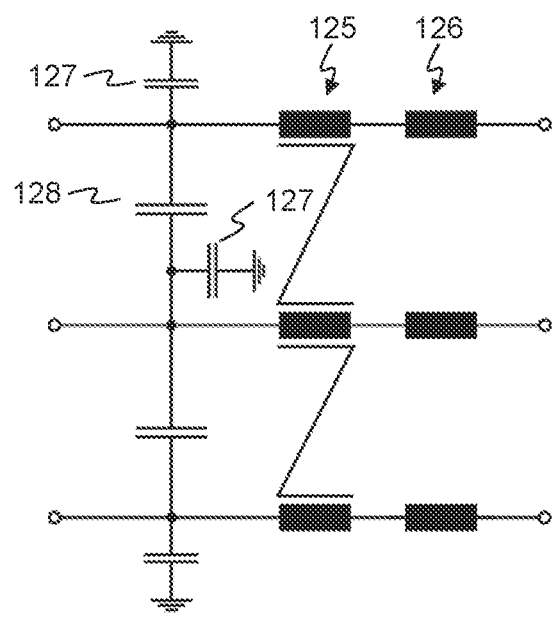
FIG. 12 represents a third embodiment of a DC voltage filter block.

A second embodiment of the DC voltage filter block (FIG. 12) has the following components:
- a three-phase common-mode filter choke 125, having three windings, each having two connections,
- three filter coils 126, each having two connections,
- three common-mode filter capacitors 127, each having two connections, and
- two filter capacitors 128, each having two connections.

The second embodiment of the DC voltage filter block realizes the following connections:
- the plus connection of the input terminal of the second embodiment of the DC voltage filter block is connected to the first connection of the first common-mode filter capacitor, the first connection of the first filter capacitor and the first connection of the first winding of the three-phase common-mode filter choke;
- the midpoint voltage connection of the input terminal of the second embodiment of the DC voltage filter block is connected to the first connection of the second common-mode filter capacitor, the second connection of the first filter capacitor, the second connection of the second filter capacitor and the first connection of the second winding of the three-phase common-mode filter choke;
- the minus connection of the input terminal of the second embodiment of the DC voltage filter block is connected to the first connection of the third common-mode filter capacitor, the first connection of the second filter capacitor and the first connection of the third winding of the three-phase common-mode filter choke;
- the second connection of the first winding of the three-phase common-mode filter choke is connected to the first connection of the first filter coil;
- the second connection of the second winding of the three-phase common-mode filter choke is connected to the first connection of the second filter coil;
- the second connection of the third winding of the three-phase common-mode filter choke is connected to the first connection of the third filter coil;
- the second connection of the first filter coil is connected to the plus connection of the output terminal of the second embodiment of the DC voltage filter block;
- the second connection of the second filter coil is connected to the midpoint voltage connection of the output terminal of the second embodiment of the DC voltage filter block;

the second connection of the third filter coil is connected to the minus connection of the output terminal of the second embodiment of the DC voltage filter block;

the second connections of all common-mode filter capacitors are connected to each other and form the ground connection of the second embodiment of the DC voltage filter block.

In a further variant of this DC voltage filter block, the series connections of filter coils and windings of the three-phase common-mode filter choke are swapped.

Depending on the realization, one or more components can be omitted:
- the three-phase common-mode filter choke can be omitted, i.e., it applies for $1 \leq k \leq 3$, that the first connection of the k-th winding is connected to the second connection of the k-th winding,
- individual or all filter coils can be omitted, i.e., in the respective filter coil or the respective filter coils, the first connection of the filter coil is connected to the second connection of the filter coil,
- individual, several or all common-mode filter capacitors can be omitted, i.e., the respective common-mode filter capacitor or the respective common-mode filter capacitors are removed from the circuit,
- combinations thereof, for example, all filter coils and all common-mode filter capacitors can be omitted.

Figure 13:
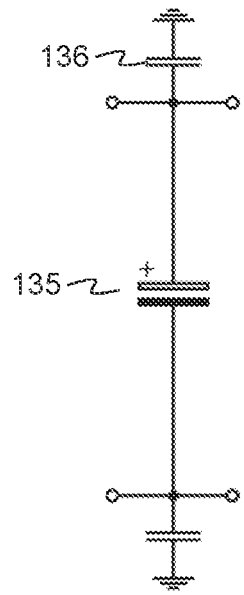
FIG. 13 represents a fourth embodiment of a DC voltage filter block.

A third embodiment of the DC voltage filter block (FIG. 13) has a capacitor 135, having two connections, and two common-mode filter capacitors 136, each having two connections. The first connection of the capacitor is connected to the plus connections of the input and output terminals of the third embodiment of the DC voltage filter block. The second connection of the capacitor is connected to the minus connections of the input and output terminals of the third embodiment of the DC voltage filter block. The first connection of the first common-mode filter capacitor is connected to the plus connections of the input and output terminals of the third embodiment of the DC voltage filter block. The first connection of the second common-mode filter capacitor is connected to the minus connections of the input and output terminals of the third embodiment of the DC voltage filter block. The second connections of the two common-mode filter capacitors are connected to each other and form the ground connection of the third embodiment of the DC voltage filter block. The midpoint voltage connections of the input and output terminals of the third embodiment of the DC voltage filter block are omitted.

A fourth embodiment of the DC voltage filter block (FIG. 14) has two capacitors 141, having two connections, and three common-mode filter capacitors 142, each having two connections. The first connection of the first capacitor is connected to the plus connections of the input and output terminals of the fourth embodiment of the DC voltage filter block. The second connection of the first capacitor is connected to the first connection of the second capacitor and the midpoint voltage connections of the input and output terminals of the fourth embodiment of the DC voltage filter block. The second connection of the second capacitor is connected to the minus connections of the input and output terminals of the fourth embodiment of the DC voltage filter block. The first connection of the first common-mode filter capacitor is connected to the plus connections of the input and output terminals of the fourth embodiment of the DC voltage filter block. The first connection of the second common-mode filter capacitor is connected to the midpoint voltage connections of the input and output terminals of the fourth embodiment of the DC voltage filter block. The first connection of the third common-mode filter capacitor is connected to the minus connections of the input and output terminals of the fourth embodiment of the DC voltage filter block. The second connections of the three common-mode filter capacitors are connected to one another and form the ground connection of the fourth embodiment of the DC voltage filter block.

Figure 15:
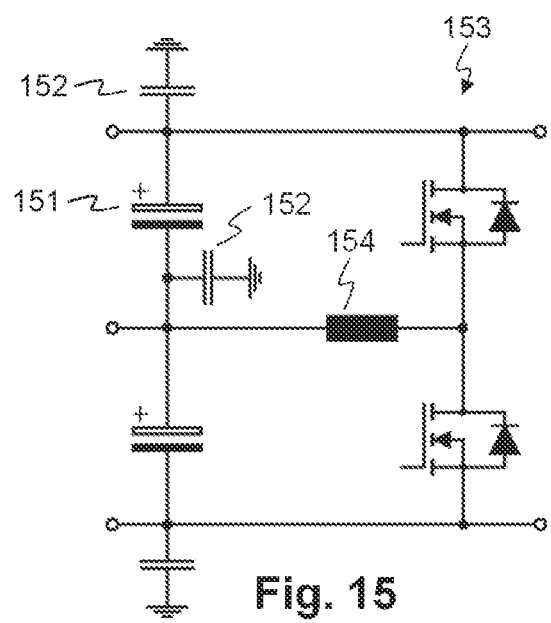
FIG. 15 represents a sixth embodiment of a DC voltage filter block.

A DC voltage filter block with active voltage balancing (FIG. 15) has the following components:
- two capacitors 151, each having two connections,
- three common-mode filter capacitors 152, each having two connections,
- a half-bridge 153 with two voltage levels, having a plus connection, a switching voltage connection and a minus connection, and
- a filter coil 154, having two connections.

The first connection of the first capacitor is connected to the plus connection of the half-bridge with two voltage levels and the plus connections of the input and output terminals of the DC voltage filter block with active voltage balancing. The second connection of the first capacitor is connected to the first connection of the second capacitor, the first connection of the filter coil and the midpoint voltage connection of the input terminals of the DC voltage filter block with active voltage balancing. The second connection of the second capacitor is connected to the minus connection of the half-bridge with two voltage levels and the minus connections of the input and output terminals of the DC voltage filter block with active voltage balancing. The second connection of the filter coil is connected to the switching voltage connection of the half-bridge with two voltage levels. The first connection of the first common-mode filter capacitor is connected to the plus connections of the input and output terminals of the DC voltage filter block with active voltage balancing. The first connection of the second common-mode filter capacitor is connected to the midpoint voltage connection of the input terminal of the DC voltage filter block with active voltage balancing. The first connection of the third common-mode filter capacitor is connected to the minus connections of the input and output terminals of the DC voltage filter block with active voltage balancing. The second connections of the three common-mode filter capacitors are connected to each other and form the ground connection of the DC voltage filter block with active voltage balancing. The midpoint voltage connection of the output terminal of the DC voltage filter block with active voltage balancing is omitted.

Examples of Embodiments of the DC/DC Converter Block

Figure 16:
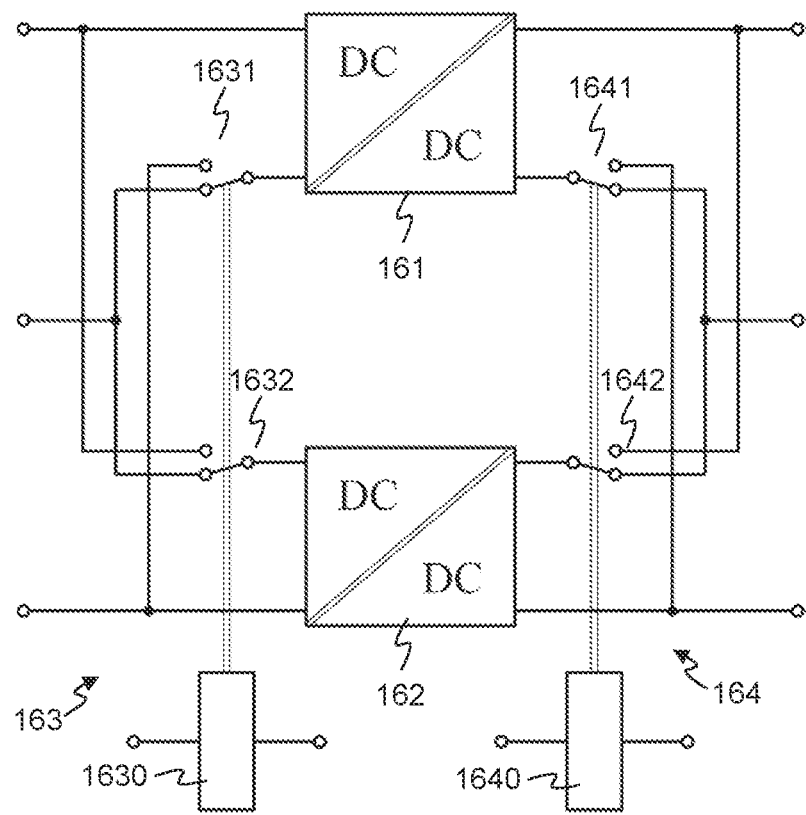
FIG. 16 represents an embodiment of a DC/DC converter.

A first embodiment of the DC/DC converter (FIG. 16) has the following components:
- two DC/DC voltage converters 161, 162, each having an input terminal block, having a plus connection and a minus connection, and an output terminal block, having a plus connection and a minus connection,
- an input-side relay 163, having a control coil 1630, having two control connections, and two change-over switches 1631, 1632, each having a change-over switch connection and two switch connections, and
- an output-side relay 164, having a control coil 1640 and two change-over switches 1641, 1642, each having a change-over switch connection and two switch connections.

Each change-over switch 1631, 1632, 1641, 1642 can have two states. In the first state, the change-over switch connection of the change-over switch is connected to the first switch connection of the change-over switch and the second switch connection of the change-over switch is not connected. In the second state, the change-over switch connection of the change-over switch is connected to the second switch connection of the change-over switch and the first switch connection of the change-over switch is not connected.

Each relay 163, 164 can have two states. In the first state of the relay, both change-over switches of the relay are in the first state of the change-over switch. In the second state of the relay, both change-over switches of the relay are in the second state of the change-over switch. The activation of a desired state of the relay takes place by suitable adjustment of a control voltage of the relay, which is applied across the two control connections of the control coil of the relay.

In the first embodiment of the DC/DC converter the following connections apply:

the plus connection of the input terminal block of the DC/DC converter is connected to the plus connection of the input terminal block of the first DC/DC voltage converter and to the first switch connection of the second change-over switch of the input-side relay 163;

the midpoint voltage connection of the input terminal block of the DC/DC converter is connected to the second switch connection of the first change-over switch 1631 of the input-side relay 163 and to the second switch connection of the second change-over switch 1632 of the input-side relay;

the minus connection of the input terminal block of the DC/DC converter is connected to the minus connection of the input terminal block of the second DC/DC voltage converter and to the first switch connection of the first change-over switch 1631 of the input-side relay;

the change-over switch connection of the first change-over switch 1631 of the input side relay is connected to the minus connection of the input terminal block of the first DC/DC voltage converter;

the change-over switch connection of the second change-over switch 1632 of the input-side relay is connected to the plus connection of the input terminal block of the second DC/DC voltage converter;

the plus connection of the output terminal block of the DC/DC converter is connected to the plus connection of the output terminal block of the first DC/DC voltage converter 161 and to the first switch connection of the second change-over switch 1642 of the output-side relay;

the midpoint voltage connection of the output terminal block of the DC/DC converter is connected to the second switch connection of the first change-over switch 1641 of the output-side relay and to the second switch connection of the second change-over switch 1642 of the output-side relay; the minus connection of the output terminal block of the DC/DC converter is connected to the minus connection of the output terminal block of the second DC/DC voltage converter 162 and to the first switch connection of the first change-over switch 1641 of the output-side relay;

the change-over switch connection of the first change-over switch 1641 of the output-side relay is connected to the minus connection of the output terminal block of the first DC/DC voltage converter;

the change-over switch connection of the second change-over switch 1642 of the output-side relay is connected to the plus connection of the output terminal block of the second DC/DC voltage converter.

The circuitry described allows for all combinations of input- and output-side parallel- or series connections of the two DC/DC voltage converters:

both relays 163, 164 in the first state: input- and output-side parallel connection of the two DC/DC voltage converters;

both relays 163, 164 in the second state: input- and output-side series connection of the two DC/DC voltage converters;

input-side relay 163 in the first state and output-side relay 164 in the second state: input-side parallel connection and output-side series connection of the two DC/DC voltage converters;

input-side relay 163 in the second state and output-side relay 164 in the first state: input-side series connection and output-side parallel connection of the two DC/DC voltage converters.

Thus, with the described first embodiment of the DC/DC converter both a halving as well as a doubling of the output voltage can be achieved solely by switching over of the relay: by switching over the input-side relay from the first to the second state a halving of the output voltage occurs and by switching over the output-side relay from the first to the second state a doubling of the output voltage occurs. This can be technically advantageous for the operation of the universal multi-phase converter topology, for example, when instead of the multi-phase operation the single-phase operation is used.

A second embodiment of the DC/DC converter results when the first embodiment of the DC/DC converter is realized without an output-side relay. Here, there are sub-variants of the output-side series or parallel connection of the two DC/DC voltage converters. By switching over the input-side relay from the first to the second state, a halving of the output voltage results.

A third embodiment of the DC/DC converter results, when the first embodiment of the DC/DC converter is realized without an input-side relay. Here, there are the sub-variants of the input-side series- or parallel connection of the two DC/DC voltage converters. By switching over the output-side relay from the first to the second state a doubling of the output voltage results.

A fourth embodiment of the DC/DC converter results, when the first embodiment of the DC/DC converter is realized without an input-side relay and without an output-side relay. Here, there are four sub-variants of the input- and output-side series- or parallel connections of the two DC/DC voltage converters. In the case of the input- and output-side parallel connections of the two DC/DC voltage converters, one DC/DC voltage converter can be removed from the circuit.

An embodiment of the (m+1)-phase common-mode filter choke has m+1 windings 171, 172, 173, 174, 175, 176, each having two connections. For $1 \leq k \leq m$ the following applies: the k-th winding of the (m+1)-phase common-mode filter choke is used for the common-mode filtering of the common-mode disturbances present in the k-th phase of the universal multi-phase converter topology. The (m+1)-th winding of the (m+1)-phase common-mode filter choke is used for the additional common-mode filtering in singe-phase operation of the universal multi-phase converter topology and, when using a magnetic core for realizing the (m+1)-phase common-mode choke, prevents the single-phase operation of the universal multi-phase converter topology from leading to saturation of the magnetic core of the (m+1)-phase common-mode choke. Each winding can be realized either by a coherent winding package or by suitable series- and/or parallel connections of several winding packages. The individual winding packages can be distributed in a geometrically suitable manner. In a technically meaningful realization, all m+1 windings of the (m+1)-phase common-mode filter choke usually have the same number of windings and the same sense of winding. In single-phase operation of the universal multi-phase converter topology, the (m+1)-th winding of the (m+1)-phase common-mode filter choke is loaded with a current, which corresponds to the sum of all currents through the first m windings of the (m+1)-phase common-mode filter choke.

When using one or more magnetic cores, increased inductance values can be achieved between the respective connections of each winding of the (m+1)-phase common-mode filter choke. Usually, in practice, ring cores are used for this purpose (FIGS. 17 and 18), but in principle, any core shapes can be used, for example, E-cores, U-cores, U-I-cores or planar cores.

Figure 17:
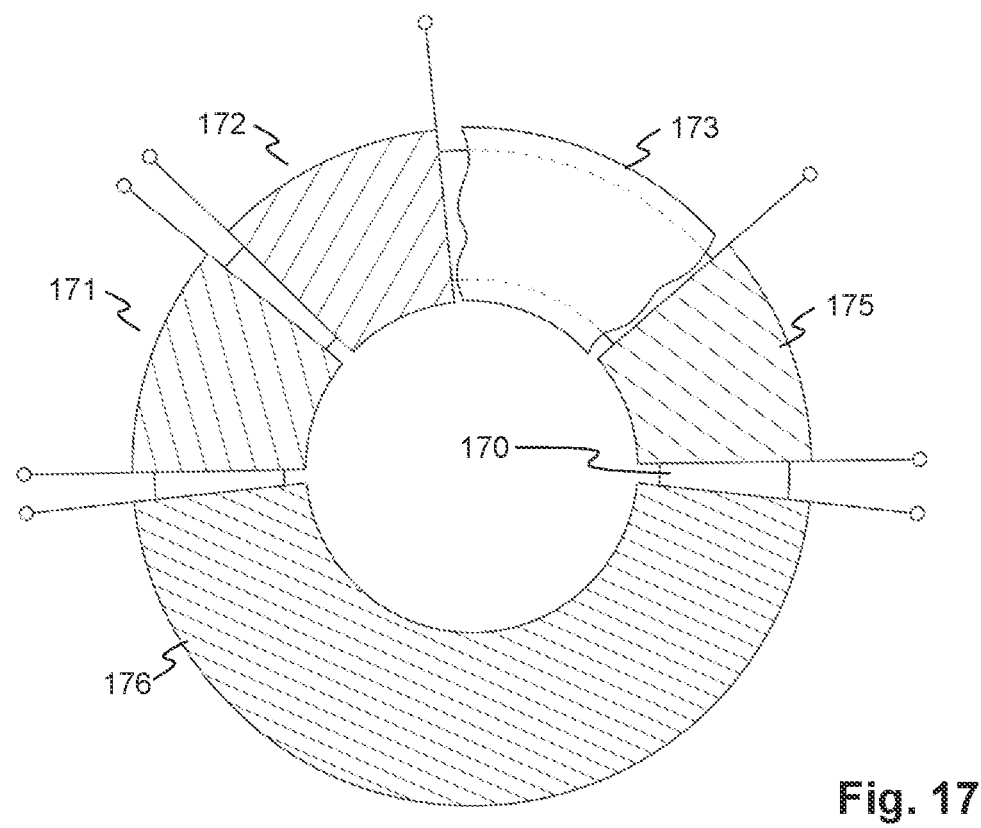
FIG. 17 represents a first embodiment of a common-mode filter choke.

A first possible embodiment of the (m+1)-phase common-mode filter choke is depicted in FIG. 17, with a first alternating voltage winding 171, a second alternating voltage winding 172, m−3 further alternating voltage windings 173, an m-th alternating voltage winding 175 and a return conductor winding 176, on a common magnetic core 170. Here, the wires necessary for realizing the first m windings 171-175 have the same conductor cross section $A_{Cu,1}$. The wire used for the (m+1)-th winding 176 has an m-times larger effective conductor cross section ($A_{Cu,m+1}=m\,A_{Cu,1}$). In FIG. 17, the (m+1)-th winding is realized as a coherent winding package.

Figure 18:
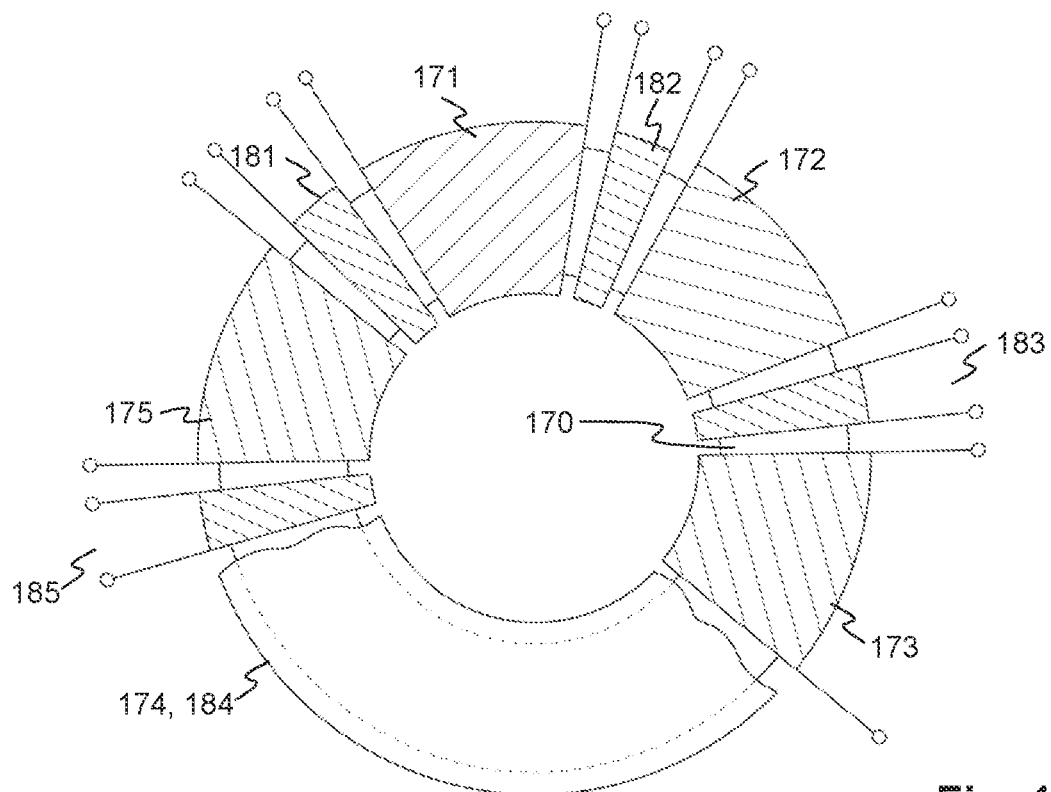
FIG. 18 represents a second embodiment of a common-mode filter choke.

A second possible embodiment of the (m+1)-phase common-mode filter choke is depicted in FIG. 18. Here, the wires necessary for realizing the first m windings have the same conductor cross section $A_{Cu,1}$. The wire used for the (m+1)-th winding has an m-times larger effective conductor cross section ($A_{Cu,m+1}=m\,A_{Cu,1}$). In contrast to FIG. 17, in FIG. 18 the (m+1)-th winding is realized as a distributed winding package, having a first, second, third to m-th winding package 181, 182, 183, 185. Further alternating voltage- and return conductor windings are denoted by 174, 184.

Figure 19:
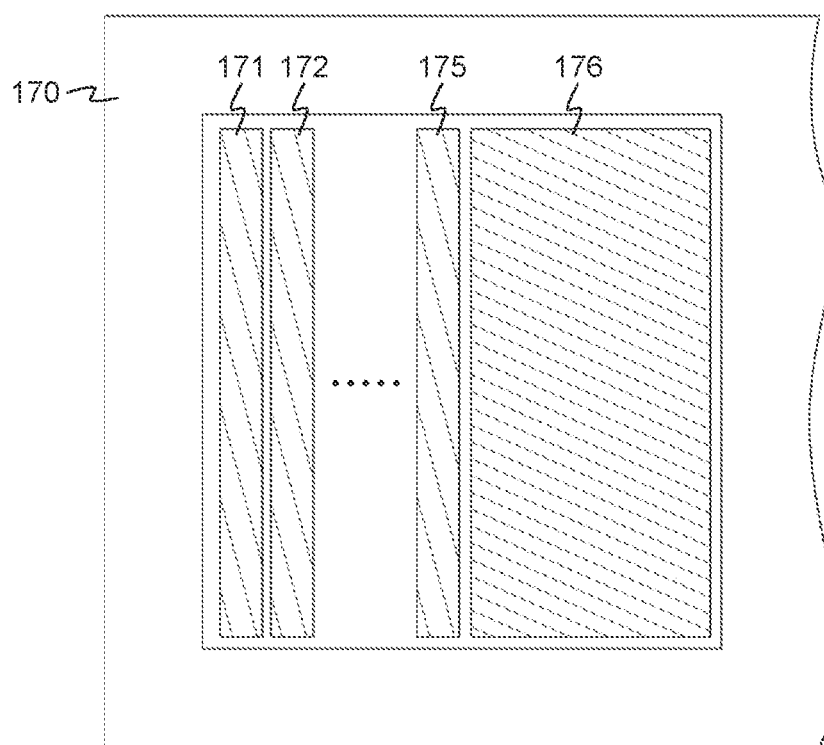
FIG. 19 represents a third embodiment of a common-mode filter choke.
Figure 20:
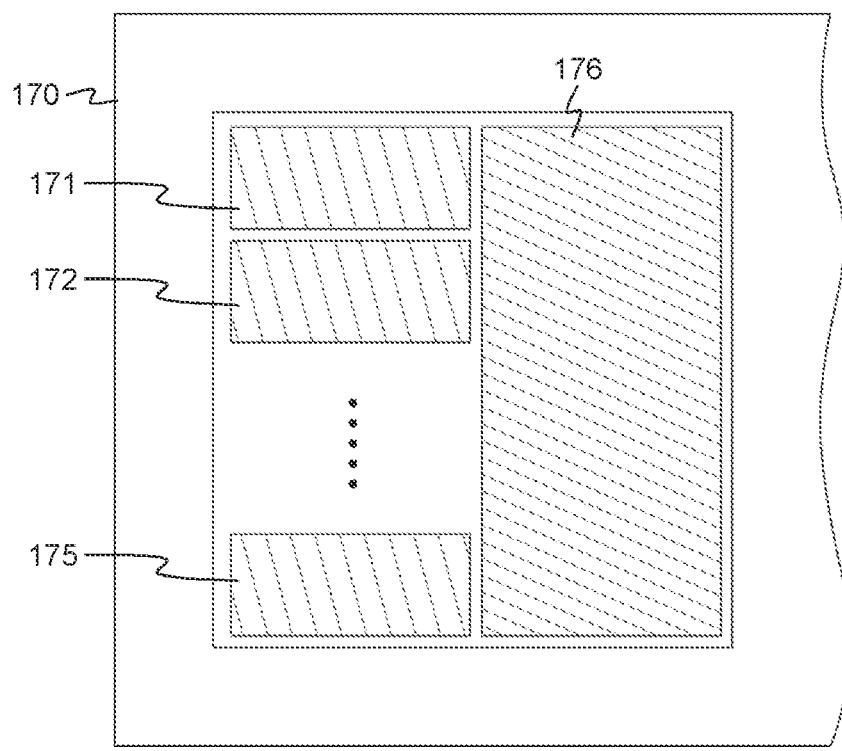
FIG. 20 represents a fourth embodiment of a common-mode filter choke.

In FIG. 19 and FIG. 20, cross-sectional drawings of possible conductor arrangements of the m+1 windings of the (m+1)-phase common-mode filter choke are depicted in the core window of E-cores, U-cores, U-I-cores or planar cores. In a technically meaningful realization, due to the increased conductor cross section requirement, for the (m+1)-th winding, the (m+1)-th winding fills the first half of the core window available for all windings and the remaining m windings share the second half of the available core window in equal parts.

Examples of Embodiments for the Universal Multi-Phase Converter Topology

Figure 7:
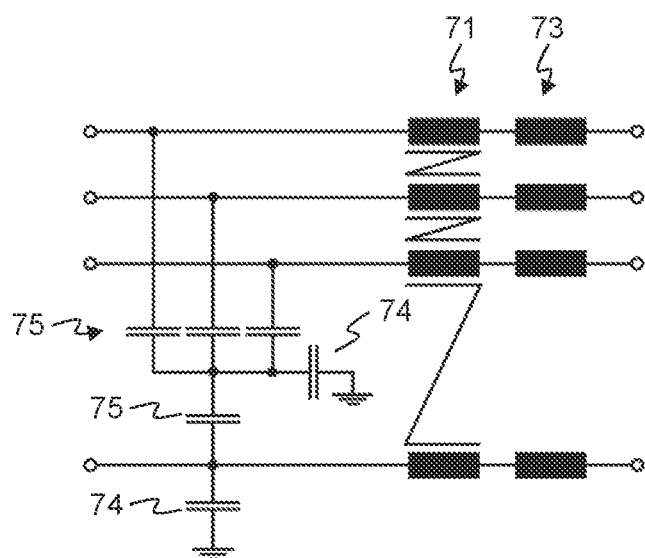
FIG. 7 represents a first embodiment of an alternating voltage filter stage.
Figure 10:
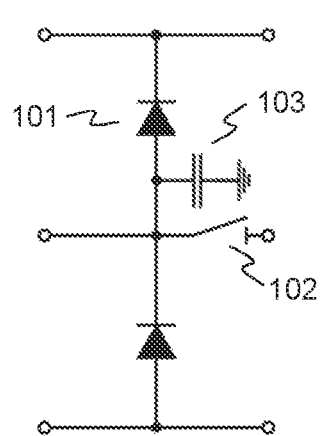
FIG. 10 represents a first embodiment of a DC voltage filter block.
Figure 11:
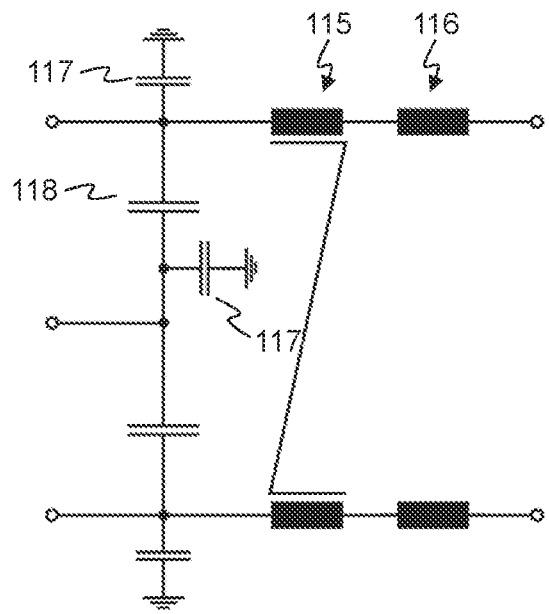
FIG. 11 represents a second embodiment of a DC voltage filter block.
Figure 14:
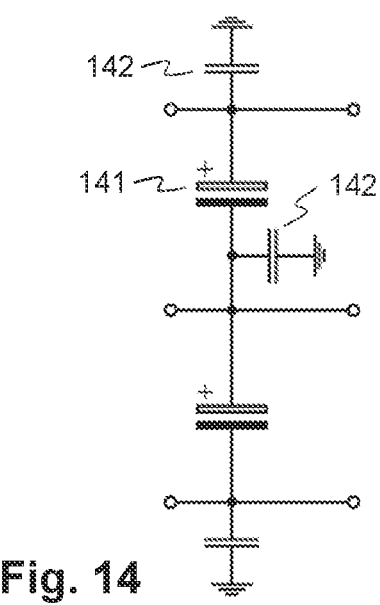
FIG. 14 represents a fifth embodiment of a DC voltage filter block.
Figure 21:
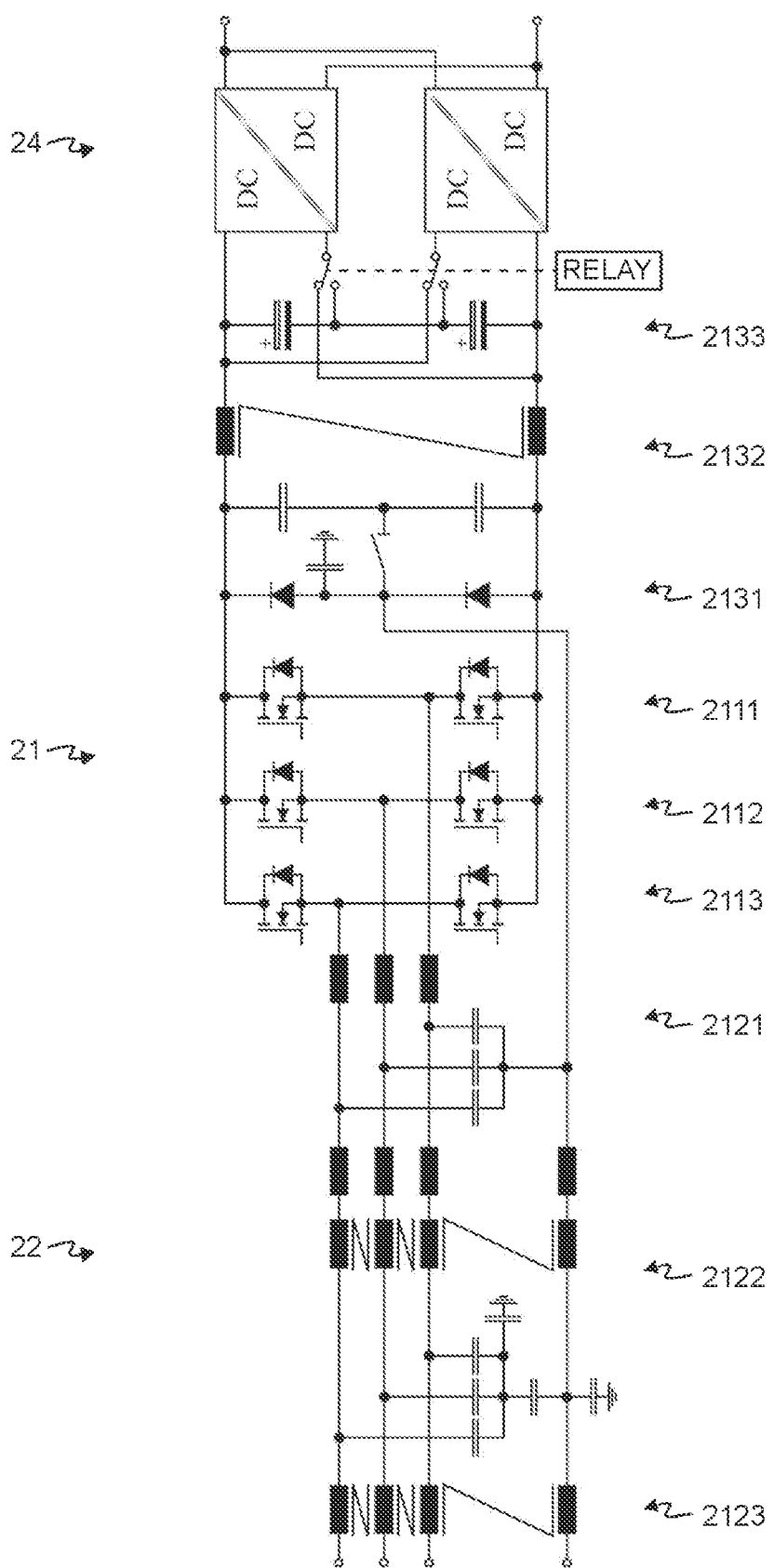
FIG. 21 represents a first variant of a converter topology.

An embodiment of the universal three-phase converter with two voltage levels (FIG. 21) is based on the embodiment of the universal multi-phase converter topology with DC/DC converter block and has m=3 and the following building blocks:
- each of the three half-bridges 2111, 2112, 2123 of the power part 21 is realized by the embodiment of the half-bridge with two voltage levels depicted in FIG. 3,
- three alternating voltage filter stages 22,
  - the first alternating voltage filter stage 2121 is realized by the first embodiment of the alternating voltage filter stage from FIG. 7, with the following adjustments: the four-phase common-mode filter choke is omitted, the fourth filter coil is omitted, the fourth filter capacitor is replaced by a short circuit and the two common-mode filter capacitors are removed from the circuit,
  - the second alternating voltage filter stage 2122 is realized by the first embodiment of the alternating voltage filter stage from FIG. 7,
  - the third alternating voltage filter stage 2123 is realized by the first embodiment of the alternating voltage filter stage from FIG. 7, with the following adjustments: all four filter coils are omitted, all four filter capacitors are removed from the circuit and the two common-mode filter capacitors are removed from the circuit,
- three DC voltage blocks:
  - the first DC voltage block 2131 is realized by the embodiment of the change-over switching block from FIG. 10,
  - the second DC voltage block 2132 is realized by the first embodiment of the DC voltage filter block from FIG. 11, with the following adjustments: the two filter coils are omitted and the three common-mode filter capacitors are removed from the circuit,
  - the third DC voltage block 2133 is realized by the fourth embodiment of the DC voltage filter block from FIG. 14, with the following adjustments: the three common-mode filter capacitors are removed from the circuit,
- the DC/DC converter block 24 is realized by the second embodiment of the DC/DC converter, with output-side parallel connection of the two DC/DC voltage converters.

Operating Mode:

Operation as a conventional three-phase converter:
- the power switches of the three half-bridges are suitably controlled for the operation as a three-phase converter with two voltage levels; the regulation, for example, of the output voltage of the converter, occurs exactly the same as in conventional three-phase converters with two voltage levels,
- switch of the change-over switching block closed,
- input-side relay of the DC/DC converter block is in the second state.

Operation as a conventional single-phase converter:
- switch of the change-over switching block open,
- power switch of the three half-bridges are operated synchronously, so that the electrical potentials at their switching voltage connections assume the same value at each point in time; the regulation, for example, of the output voltage of the converter, occurs exactly the same as in the case of conventional single-phase converters with two voltage levels,
- compared with the operation as a conventional three-phase converter, an efficient operation of the circuit occurs at half the intermediate circuit voltage (i.e., the voltage between the plus- and minus connections of the power part); for the maintenance of the output voltage of the converter, the input-side relay of the DC/DC converter block is therefore operated in the first state.

Figure 5:
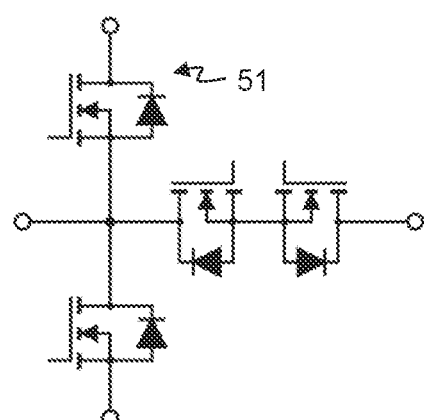
FIG. 5 represents a third embodiment of a half-bridge.
Figure 22:
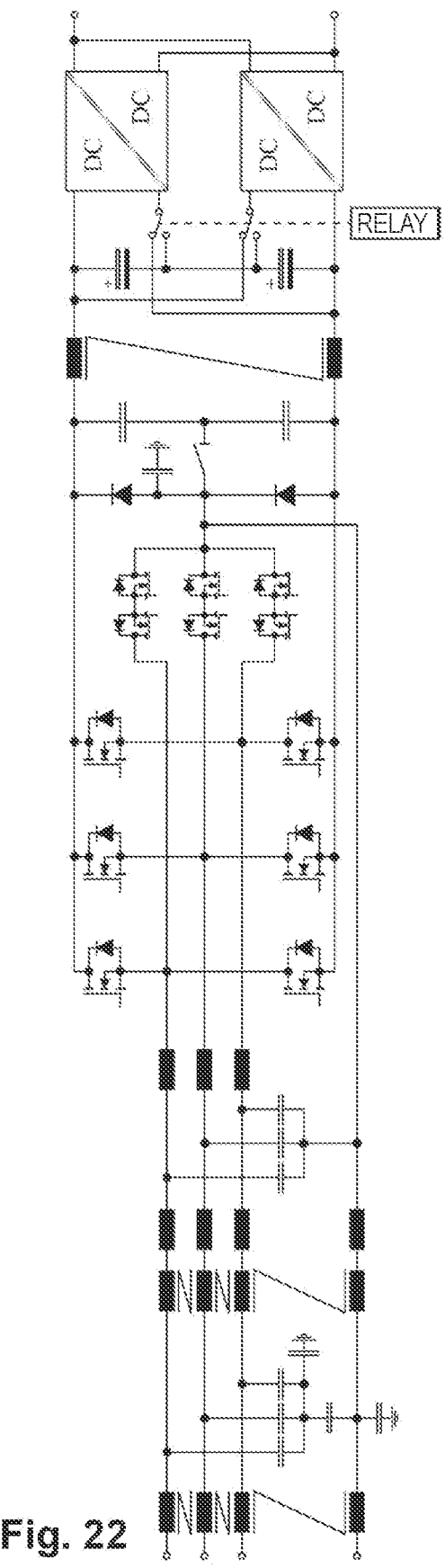
FIG. 22 represents a second variant of a converter topology.

A first embodiment of the universal three-phase converter with active T-type half-bridges (FIG. 22) is based on the embodiment of the universal multi-phase converter topology with DC/DC converter block and has m=3 and the following building blocks:

each of the three half-bridges is realized by the embodiment of the active T-type half-bridge depicted in FIG. 5,
four alternating voltage filter stages,
  the first alternating voltage filter stage is realized by the first embodiment of the alternating voltage filter stage from FIG. 7, with the following adjustments: the four-phase common-mode filter choke is omitted, the fourth filter coil is omitted, the fourth filter capacitor is replaced by a short circuit and the two common-mode filter capacitors are removed from the circuit,
  the second alternating voltage filter stage is realized by the first embodiment of the alternating voltage filter stage from FIG. 7, with the following adjustments: the fourth filter capacitor is replaced by a short circuit and the two common-mode filter capacitors are removed from the circuit,
  the third alternating voltage filter stage is realized by the first embodiment of the alternating voltage filter stage from FIG. 7, with the following adjustments: the four-phase common-mode filter choke is omitted, all four filter coils are omitted, the first common-mode filter capacitor is replaced by a short circuit and the second common-mode filter capacitor is removed from the circuit.
  The fourth alternating voltage filter stage is realized by the first embodiment of the alternating voltage filter stage from FIG. 7, with the following adjustments: all four filter coils are omitted, all four filter capacitors are removed from the circuit and the two common-mode filter capacitors are removed from the circuit.
three DC voltage blocks:
  the first DC voltage block is realized by the embodiment of the change-over switching block from FIG. 10,
  the second DC voltage block is realized by the first embodiment of the DC voltage filter block from FIG. 11, with the following adjustments: the two filter coils are omitted and the three common-mode filter capacitors are removed from the circuit,
  the third DC voltage block is realized by the fourth embodiment of the DC voltage filter block from FIG. 14, with the following adjustment: the three common-mode filter capacitors are removed from the circuit,
the DC/DC converter block is realized by the second embodiment of the DC/DC converter, with output-side parallel connection of the two DC/DC voltage converters.
Mode of Operation:
Operation as a three-phase converter:
  the power switch of the three half-bridges are suitably controlled for operation as a three-phase converter with three voltage levels; the regulation, for example, of the output voltage of the converter, occurs exactly the same as in the conventional three-phase converter with three voltage levels,
  switch of the change-over switching block closed,
  input-side relay of the DC/DC converter block is in the second state.
Operation as a single-phase converter:
  switch of the change-over switching block open,
  power switch of the three half-bridges are operated synchronously, so that the electrical potentials at their switching voltage connections assume the same value at each point in time; the regulation, for example, of the output voltage of the converter, occurs exactly the same as in the conventional singe-phase converter with two voltage levels,
  Compared with the operation as a conventional three-phase converter, an efficient operation of the circuit occurs at half the intermediate circuit voltage (i.e., the voltage between the plus- and minus connections of the power part); for the maintenance of the output voltage of the converter, the input-side relay of the DC/DC converter block is therefore operated in the first state.

Figure 23:
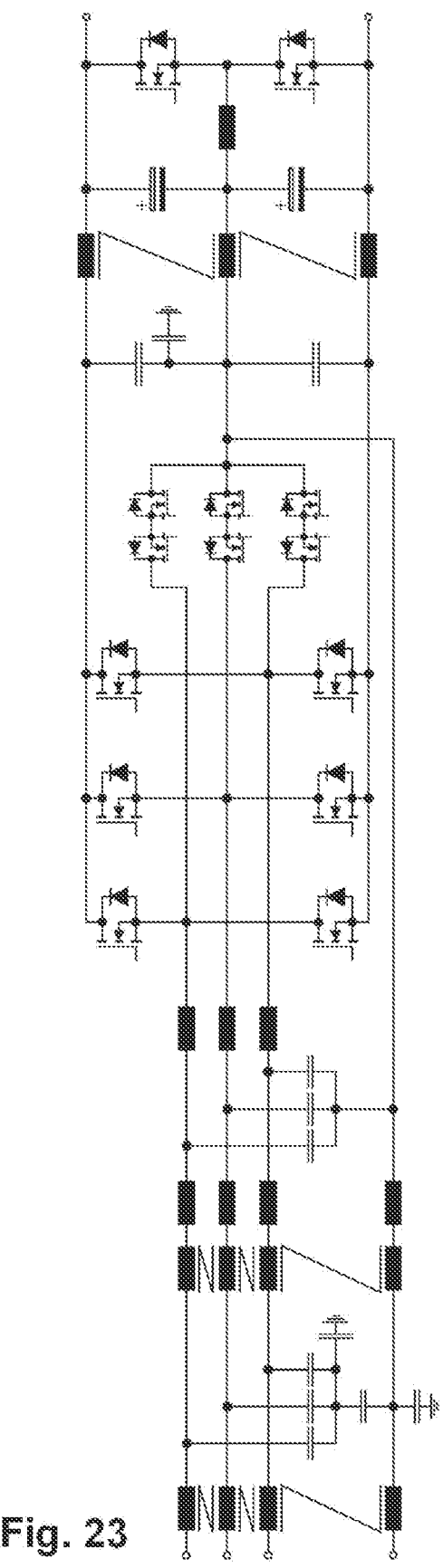
FIG. 23 represents a third variant of a converter topology.

A second embodiment of the universal three-phase converter with active T-type half-bridges (FIG. 23) is based on the embodiment of the universal multi-phase converter topology without DC/DC converter block and has m=3 and the following building blocks:
  each of the three half-bridges is realized by the embodiment of the active T-type half-bridge depicted in FIG. 5,
  four alternating voltage filter stages:
    the first alternating voltage filter stage is realized by the first embodiment of the alternating voltage filter stage from FIG. 7, with the following adjustments: the four-phase common-mode filter choke is omitted, the fourth filter coil is omitted, the fourth filter capacitor is replaced by a short circuit and the two common-mode filter capacitors are removed from the circuit,
    the second alternating voltage filter stage is realized by the first embodiment of the alternating voltage filter stage from FIG. 7, with the following adjustments: the fourth filter capacitor is replaced by a short circuit and the two common-mode filter capacitors are removed from the circuit.
    The third alternating voltage filter stage is realized by the first embodiment of the alternating voltage filter stage from FIG. 7, with the following adjustments: the four-phase common-mode filter choke is omitted, all four filter coils are omitted, the first common-mode filter capacitor is replaced by a short circuit and the second common-mode filter capacitor is removed from the circuit.
    the fourth alternating voltage filter stage is realized by the first embodiment of the alternating voltage filter stage from FIG. 7, with the following adjustments: all four filter coils are omitted, all four filter capacitors are removed from the circuit and the two common-mode filter capacitors are removed from the circuit.
  two DC voltage blocks:
    the first DC voltage block is realized by the first embodiment of the DC voltage filter block from FIG. 12, with the following adjustments: the three filter coils are omitted, the first common-mode filter capacitor is removed from the circuit and the third common-mode filter capacitor is removed from the circuit,
    the third DC voltage block is realized by the DC voltage filter block with active voltage balancing from FIG. 15.
Mode of Operation:
Operation as a three-phase converter:
  the power switch of the three half-bridges are suitably controlled for the operation as a three-phase converter with three voltage levels; the regulation, for example, of the output voltage of the converter, occurs exactly the same as in the conventional three-phase converter with three voltage levels.

Operation as a conventional single-phase converter:
the power switches of the three half-bridges are operated synchronously, so that the electrical potentials at their switching voltage connections assume the same value at each point in time; the regulation, for example, of the output voltage of the converter, occurs exactly the same as in the conventional single-phase converter with three voltage levels.

Compared with the embodiment of the universal three-phase converter with two voltage levels (FIG. 21) and the first embodiment of the universal three-phase converter with active T-type half-bridges (FIG. 22), the second embodiment of the universal three-phase converter with active T-type half-bridges (FIG. 23) has the advantage that the change-over switching block and the DC/DC converter block are omitted, but the disadvantage that for the meaningful technical operation the DC voltage filter block with active voltage balancing is required. The DC voltage filter block with active voltage balancing can in principle be omitted, however, for the practical operation as a single-phase converter comparatively high capacitance values would then be required for the filter capacitors of the first DC voltage block.

The invention claimed is:

1. A multi-phase converter topology for the transmission of electrical energy from an alternating voltage input with m grid phase connections to a DC voltage output or vice versa, the multi-phase converter comprising:
a power part comprising half-bridges configured to switch currents, wherein each of the half-bridges comprises a plus connection and a minus connection;
an alternating voltage filter connected between the power part and the alternating voltage input, the alternating voltage filter comprising at least one alternating voltage filter stage with m+1 input connections, m+1 output connections, and a ground connection;
a DC input terminal block with a plus connection and a minus connection, wherein the plus connection and the minus connection of each of the half-bridges are connected to the plus connection and the minus connection of the input terminal block, respectively; and
one or more DC voltage blocks serially connected between the DC input terminal block and the DC voltage output for filtering DC voltages;
wherein the multi-phase converter topology has a single-phase mode of operation, in which: the m grid phase connections are connected in parallel to one another and form a first phase connection for the connection of a single-phase alternating voltage, and a neutral conductor connection of the alternating voltage filter is connected to a neutral conductor connection of the alternating voltage input, and the neutral conductor connection of the alternating voltage input forms a second phase connection for the connection of the single-phase alternating voltage.

2. The multi-phase converter topology according to claim 1, wherein the alternating voltage filter (22) comprises at least one (m+1)-phase common-mode filter choke, which does not saturate during single-phase operation of the multi-phase converter.

3. The multi-phase converter topology according to claim 2, wherein the at least one (m+1)-phase common-mode filter choke of the alternating voltage filter comprises m+1 windings, and the m+1 windings each have a same number of turns and a same winding direction.

4. The multi-phase converter topology according to claim 3, wherein wires of a first m windings of the m+1 windings have a same first conductor cross section, and a wire of the (m+1)-th winding of the m+1 windings has a conductor cross section which is m-times the first conductor cross section.

5. The multi-phase converter topology according to claim 1, further comprising a DC/DC converter block having at least two DC/DC converters, wherein inputs of the at least two DC/DC converters are selectively switchable between a series and a parallel arrangement.

6. The multi-phase converter topology according to claim 1, further comprising a DC/DC converter block having two DC/DC converters,
wherein
inputs of the two DC/DC converters are selectively switchable between a series and a parallel arrangement;
wherein outputs of the two DC/DC converters are connected in parallel to form the DC voltage output; and
wherein the power part comprises half-bridges configured to form a converter having two voltage levels.

7. The multi-phase converter topology according to claim 1,
wherein the power part comprises half-bridges for switching three voltage levels, and
wherein outputs of a DC voltage block (23) form the DC voltage output (26).

8. The multi-phase converter topology according to claim 1, further comprising a DC/DC converter block having at least two DC/DC converters, wherein outputs of the at least two DC/DC converters are selectively switchable between a series and a parallel arrangement.

9. The multi-phase converter topology according to claim 8, wherein inputs of the at least two DC/DC converters are selectively switchable between a series and a parallel arrangement.

10. The multi-phase converter topology according to claim 1,
wherein the power part comprises a midpoint voltage connection which is connected to a midpoint voltage connection of the alternating voltage filter and with a midpoint voltage connection of the input terminal block;
wherein the midpoint voltage connection of the alternating voltage filter is formed by the (m+1)-th output connection of a first one of the at least one alternating voltage filter stage; and
wherein the neutral conductor connection of the alternating voltage filter is formed by the (m+1)-th input connection of a last one of the at least one alternating voltage filter stage.

11. A multi-phase converter topology, comprising:
an alternating voltage terminal block with three grid phase connections and a neutral conductor connection,
a DC voltage terminal block with a plus connection and a minus connection,
a power part comprising half-bridges configured to switch currents,
an alternating voltage filter connected between the power part and the alternating voltage terminal block, the alternating voltage filter comprising a midpoint voltage connection and a ground connection,
a DC voltage block and a first DC voltage filter block connected between the power part and the DC voltage terminal block,
wherein the DC voltage block comprises a first diode, a second diode, a switch, a first midpoint voltage node, a second midpoint voltage node, a plus connection node and a minus connection node, wherein the first diode and the second diode are connected in series between the plus connection node and the minus connection node, wherein a midpoint between the first diode and the second diode forms the first midpoint voltage node and is connected to the midpoint voltage connection, wherein the switch is connected between the first midpoint voltage node and the second midpoint voltage node, wherein the first DC voltage filter block comprises two filter capacitors, wherein the two filter capacitors are connected in series between the plus connection node and the minus connection node, wherein a midpoint between the two filter capacitors is connected to the second midpoint voltage node, wherein the two-phase common-mode filter choke comprises a first coil connected between the first switching voltage node and a plus connection node and a second coil connected between the second switching voltage node and a minus connection node, wherein the second DC voltage filter block comprises two capacitors connected in series between the plus connection node and the minus connection node, and wherein the multi-phase converter topology is configured to selectively operate as a three-phase converter and as a single-phase converter, wherein when operating as a single-phase converter the three grid phase connections are connected in parallel to one another and form a first single-phase connection, and wherein the neutral conductor connection forms a second single-phase connection.

12. The multi-phase converter topology of claim 11, further comprising a DC/DC converter connected between the plus connection and the minus connection of the DC voltage terminal block.

13. The multi-phase converter topology of claim 11, wherein the switch is configured to be closed when the multi-phase converter topology operates as a three-phase converter and the switch is configured to be open when the multi-phase converter topology operates as a single-phase converter.

14. The multi-phase converter topology of claim 11, wherein the DC voltage block further comprises a common-mode filter capacitor, wherein a first connection of the common-mode filter capacitor is connected to the first midpoint voltage node and wherein a second connection of the common-mode filter capacitor is connected to the ground connection.

15. The multi-phase converter topology of claim 11, wherein the first DC voltage filter block further comprises a two-phase common-mode filter choke, wherein the two-phase common-mode filter choke comprises a first coil having a first connection connected to the plus connection node and a second coil having a first connection connected to the minus connection node.

16. The multi-phase converter topology of claim 15, further comprising a second DC voltage filter block, wherein the second DC voltage filter block comprises two capacitors connected in series between a second connection of the first coil and a second connection of the second coil.

17. The multi-phase converter topology of claim 11, wherein the neutral conductor connection is connected to the midpoint voltage connection.

18. A multi-phase converter topology for the transmission of electrical energy from an alternating voltage input with m grid phase connections to a DC voltage output or vice versa, the multi-phase converter comprising:

a power part comprising half-bridges configured to switch currents;

an alternating voltage filter connected between the power part and the alternating voltage input, the alternating voltage filter comprising at least one alternating voltage filter stage with m+1 input connections, m+1 output connections, and a ground connection;

one or more DC voltage blocks connected between the power part and the DC voltage output for filtering DC voltages;

wherein the multi-phase converter topology has a single-phase mode of operation, in which: the m grid phase connections are connected in parallel to one another and form a first phase connection for the connection of a single-phase alternating voltage, and a neutral conductor connection of the alternating voltage filter is connected to a neutral conductor connection of the alternating voltage input, and the neutral conductor connection of the alternating voltage input forms a second phase connection for the connection of the single-phase alternating voltage;

a DC/DC converter block having two DC/DC converters, wherein inputs of the two DC/DC converters are selectively switchable between a series and a parallel arrangement;

wherein outputs of the two DC/DC converters are connected in parallel to form the DC voltage output;

wherein the power part comprises half-bridges configured to form a converter having three voltage levels; and wherein the multi-phase converter topology comprises a control configured to operate the converter topology selectively in a multi-phase operation with three voltage levels and in a single-phase operation with two voltage levels.

* * * * *